US011393260B2

(12) United States Patent
Shekar et al.

(10) Patent No.: US 11,393,260 B2
(45) Date of Patent: Jul. 19, 2022

(54) ROVING MAINTENANCE VEHICLE SYSTEM

(71) Applicant: Toyota Motor North America, Inc., Plano, TX (US)

(72) Inventors: Raja Shekar, Dallas, TX (US); Joshua Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 316 days.

(21) Appl. No.: 16/240,264

(22) Filed: Jan. 4, 2019

(65) Prior Publication Data

US 2020/0219332 A1    Jul. 9, 2020

(51) Int. Cl.
*B60W 60/00* (2020.01)
*G07C 5/00* (2006.01)
*G07C 5/08* (2006.01)

(52) U.S. Cl.
CPC .......... *G07C 5/006* (2013.01); *B60W 60/0025* (2020.02); *G07C 5/008* (2013.01); *G07C 5/085* (2013.01); *G07C 5/0808* (2013.01)

(58) Field of Classification Search
CPC ...... G07C 5/006; G07C 5/0808; G07C 5/085; G07C 5/008; G07C 5/0841; B60P 3/14; B60W 60/0025
See application file for complete search history.

(56) References Cited

U.S. PATENT DOCUMENTS

| 5,833,294 A  * | 11/1998 | Williams ................. B60P 3/14 296/24.32 |
| 6,173,941 B1 * | 1/2001  | Johnston .................. B60P 3/14 254/420 |
| 8,955,897 B1 * | 2/2015  | Miller ....................... B60P 3/14 296/24.32 |
| 9,053,588 B1 * | 6/2015  | Briggs ............. G06Q 10/06315 |
| 9,505,494 B1   | 11/2016 | Marlow et al. |
| 10,037,632 B2  | 7/2018  | Dudar et al. |
| 10,423,934 B1 *| 9/2019  | Zanghi ................. G05D 1/0225 |
| 10,943,413 B1 *| 3/2021  | Harvey ................. G06Q 40/08 |

(Continued)

FOREIGN PATENT DOCUMENTS

DE    102015007156 A1    12/2016
WO    2018004638 A1     1/2018

*Primary Examiner* — Nadeem Odeh
(74) *Attorney, Agent, or Firm* — Dinsmore & Shohl LLP

(57) ABSTRACT

A roving maintenance vehicle system includes a computing device having a processor and a non-transitory computer readable memory, a transceiver unit communicatively coupled to the computing device and a machine-readable instruction set stored in the non-transitory computer readable memory. The machine-readable instruction set causes the roving maintenance vehicle system to perform at least the following when executed by the processor: broadcast, via the transceiver unit, a notification of availability of the roving maintenance vehicle in an area, receive, via the transceiver unit, a status from one or more vehicles in response to the broadcast of the notification of the roving maintenance vehicle in the area, identify one or more vehicles that require service based on the status from the one or more vehicles, and dispatch the roving maintenance vehicle to a location of a first vehicle of the one or more vehicles that require service.

20 Claims, 5 Drawing Sheets

(56) References Cited

U.S. PATENT DOCUMENTS

| | | | |
|---|---|---|---|
| 2007/0113921 A1* | 5/2007 | Capizzo | B60L 53/62 |
| | | | 141/231 |
| 2017/0129602 A1 | 5/2017 | Alduaiji et al. | |
| 2017/0278312 A1* | 9/2017 | Minster | G06Q 10/00 |
| 2018/0012427 A1* | 1/2018 | Ricci | B60W 40/08 |
| 2018/0244387 A1 | 8/2018 | Russell | |
| 2019/0172278 A1* | 6/2019 | Castro Duran | G07C 5/08 |
| 2019/0197795 A1* | 6/2019 | Mondello | G07C 5/008 |
| 2019/0204097 A1* | 7/2019 | Stams | G06Q 10/20 |

* cited by examiner

ROVING MAINTENANCE VEHICLE SYSTEM

TECHNICAL FIELD

The present specification generally relates to providing a roving maintenance vehicle. More specifically, the present specification relates to systems and methods for providing an autonomous roving maintenance vehicle to a vehicle requiring service.

BACKGROUND

Vehicle maintenance services are generally performed at a service shop, a maintenance garage, a gas station, or a dealership. Vehicle owners may schedule an appointment for service and bring their vehicle to the maintenance garage where mechanics perform maintenance operations on the vehicle. In the event a vehicle breaks down and is unable to drive to a repair shop, a tow truck may pick up the vehicle and deliver the vehicle to the repair shop for maintenance services. In some instances, a roadside assistance vehicle may be provided to the location of a broken down vehicle where a technician may perform repair services on the vehicle and/or transport the vehicle to a repair shop for repair.

SUMMARY

In one embodiment, a roving maintenance vehicle system includes a computing device having a processor and a non-transitory computer readable memory, a transceiver unit communicatively coupled to the computing device and a machine-readable instruction set stored in the non-transitory computer readable memory. The machine-readable instruction set causes the roving maintenance vehicle system to perform at least the following when executed by the processor: broadcast, via the transceiver unit, a notification of availability of a roving maintenance vehicle in an area, receive, via the transceiver unit, a status from one or more vehicles in response to the broadcast of the notification of the roving maintenance vehicle in the area, identify one or more vehicles that require service based on the status from the one or more vehicles, and dispatch the roving maintenance vehicle to a location of a first vehicle of the one or more vehicles that require service.

In some embodiments, a method of providing a roving maintenance vehicle includes broadcasting, via a transceiver unit, a notification of availability of the roving maintenance vehicle in an area, receiving, via the transceiver unit, a status from one or more vehicles in response to the broadcast of the notification of the roving maintenance vehicle in the area, identifying one or more vehicles that requires service based on the status from the one or more vehicle, and dispatching the roving maintenance vehicle to a location of a first vehicle of the one or more vehicles that requires service.

In some embodiments, a roving maintenance vehicle includes a computing device having a processor and a non-transitory computer readable memory, a navigation system for navigating the roving maintenance vehicle to a first vehicle that requires service, where the navigation system is communicatively coupled to the computing device, a transceiver unit communicatively coupled to the computing device, and a machine-readable instruction set stored in the non-transitory computer readable memory. The machine-readable instruction set causes the roving maintenance vehicle to perform at least the following when executed by the processor: broadcast, via the transceiver unit, a notification of availability of the roving maintenance vehicle in an area, receive, via the transceiver unit, a status from one or more vehicles in response to the broadcast of the notification of the roving maintenance vehicle in the area, identify one or more vehicles that require service based on the status from the one or more vehicles, and autonomously maneuver the roving maintenance vehicle to a location of a first vehicle of the one or more vehicles that requires service.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
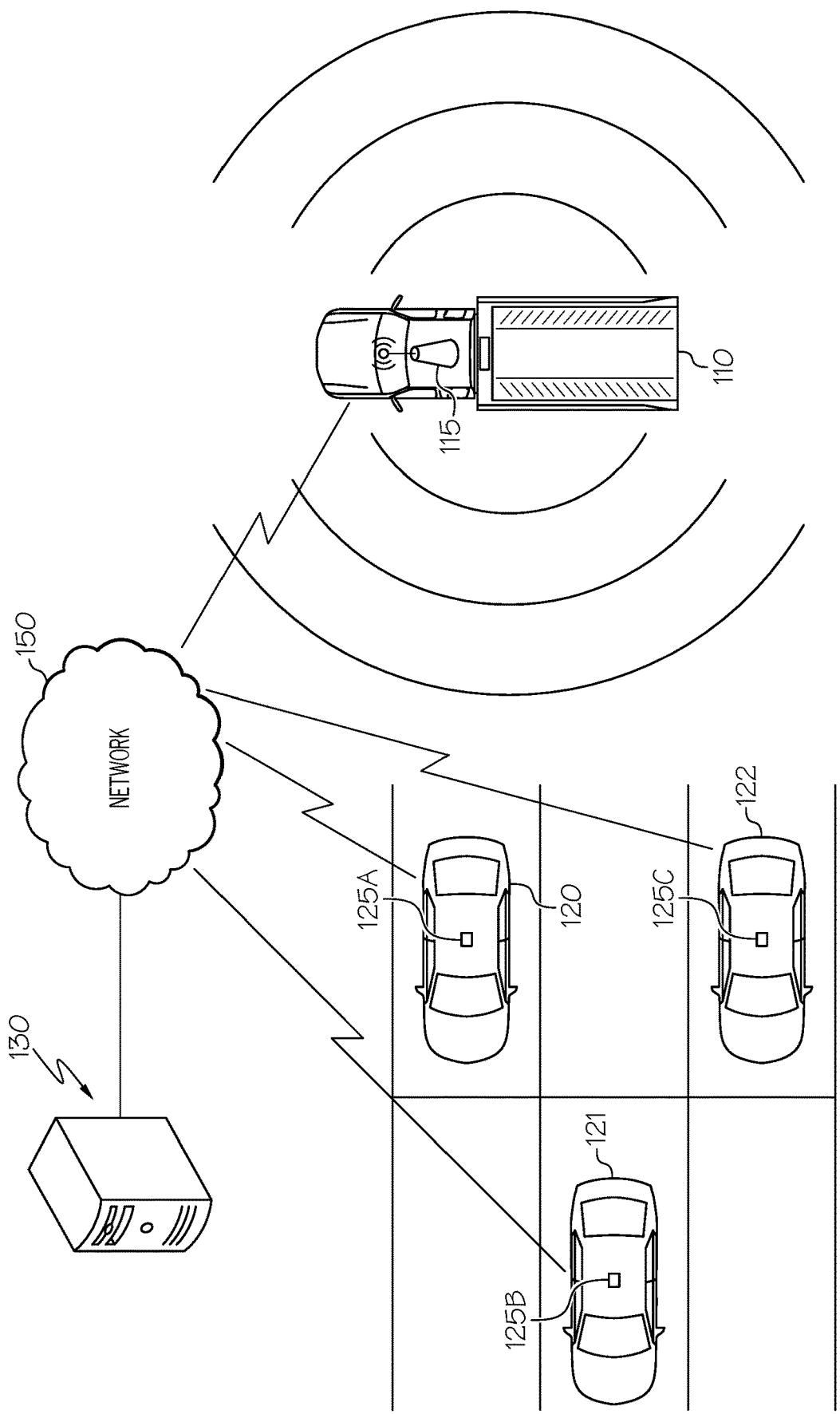
FIG. 1 depicts an illustrative environment of a parking lot where a roving maintenance vehicle system is implemented according to one or more embodiments shown and described herein.

The embodiments disclosed herein include a roving maintenance vehicle system, a roving maintenance vehicle configured to implement the roving maintenance vehicle system and methods thereof. The roving maintenance vehicle system may broadcast a notification to all vehicles within an area that a roving maintenance vehicle is available to provide service to a vehicle. In response to the broadcasted notification, vehicles may provide a status of one or more vehicle components or systems to the roving maintenance vehicle system. The roving maintenance vehicle system may identify which, if any, vehicles need service in an area and then may dispatch a roving maintenance vehicle to the location of the vehicle needing service.

In some embodiments, the roving maintenance vehicle may autonomously navigate an area such as a parking lot, city streets, and highways and proceed to locate vehicles in need of service. The roving maintenance vehicle may be configured to identify vehicles in need of replacement parts, repair services, preventative maintenance service or the like. For example, the roving maintenance vehicle system may provide equipment, parts, and/or assistance for carrying out preventative maintenance services, repair activities, or other basic care such as providing fuel, battery charging, or the like.

Many times needed vehicle repairs or maintenance do not rise to a level that an owner believes is critical enough to set aside time to address since doing so may require scheduling an appointment and/or making a special trip to a service center. However, as basic care and preventative maintenance for a vehicle are delayed, the likelihood of a vehicle breakdown increases.

In some embodiments, the vehicles may send a request for maintenance to the roving maintenance vehicle. For example, in the event of a flat tire, dead battery, or the like, a vehicle may broadcast a message requesting assistance. The message may be received by a roving maintenance vehicle and the roving maintenance vehicle may travel to the vehicle's location based on location information included in the message. Furthermore, vehicles tend to sit idle more than they are in operation. As such, a roving maintenance vehicle system may capitalize on the times a vehicle is sitting idle by identifying an idle vehicle in need of repair services, preventative maintenance, or basic care and come to the location of the idle vehicle to provide such a service. These services may be rendered with the assistance of a mechanic traveling with the roving maintenance or may be completed autonomously through the implementation of robotic features equipped on the roving maintenance vehicle as described herein. In some embodiments, the maintenance may be completed by the owner simply by being provided with the tools and parts carried by the roving maintenance vehicle.

Embodiments of the present concept, which will now be described in more detail, include systems and methods of providing a roving maintenance vehicle by broadcasting an availability to vehicles in an area, receiving status information from a vehicle, identifying a vehicle in need of services, and dispatching a roving maintenance vehicle to the location of the vehicle. Embodiments of the present concept may include a roving maintenance vehicle (e.g., an autonomous vehicle) capable of providing maintenance on vehicles (e.g., changing oil, inflating tires, changing tires, swapping out batteries, providing fuel or charge to a battery, or the like) in a geographic area autonomously or with assistance from a mechanic traveling in the autonomous roving maintenance vehicle.

Turning now to the drawings where like numbers refer to like structures, and particularly to FIG. 1, an illustrative environment of a parking lot where a roving maintenance vehicle system is deployed is depicted. The roving maintenance vehicle system may be deployed through a roving maintenance vehicle or through a separate computing device and network capable of interconnecting vehicles in an area with a roving maintenance vehicle. In some embodiments, a roving maintenance vehicle 110 may include a transceiver 115 that is capable of broadcasting notifications such as messages to vehicles in an area such as a parking lot. Vehicles 120, 121, 122 may also include respective transceivers 125A, 125B, 125C for receiving the notifications broadcast from the roving maintenance vehicle 110 and for proving responsive messages. In some embodiments, a computing device 130 such as a server may implement the communications portion of the roving maintenance vehicle system through a network 150. The roving maintenance vehicle 110 and the vehicles 120, 121, 122 may communicate with each other and with the computing device 130 implementing the roving maintenance vehicle system through a connection to the network 150. The network 150 may be the internet, a telecommunication network, a vehicle-to-vehicle network or the like.

For example, a roving maintenance vehicle 110 may be located in a parking lot or may be autonomously traveling through a parking lot seeking out vehicles 120, 121, 122 in need of services such as a repair, preventative maintenance, basic care, or the like. The vehicles 120, 121, 122 parked in the parking lot may provide status information to the roving maintenance vehicle system so that the roving maintenance vehicle system may identify the vehicles 120, 121, 122 that a roving maintenance vehicle 110 may assist. Since the types of services a vehicle 120, 121, 122 may require can vary widely, the determination as to which vehicle is serviced may depend on the capability of the roving maintenance vehicle 110. For example, the roving maintenance vehicle 110 may be configured provide a predetermined type of maintenance such as providing fuel or battery charging or may include a predefined number and type of replacement parts. As such, the roving maintenance vehicle 110 may need to be paired with vehicles in which it is currently capable of assisting, so that a service is not initiated for which the roving maintenance vehicle 110 may not be fully equipped to complete. For example, if a repair service may include the need to replace a part that the roving maintenance vehicle 110 does not currently have in stock on the roving maintenance vehicle 110 then the roving maintenance vehicle system may not select the vehicle 120, 121, 122 for service.

Figure 2:
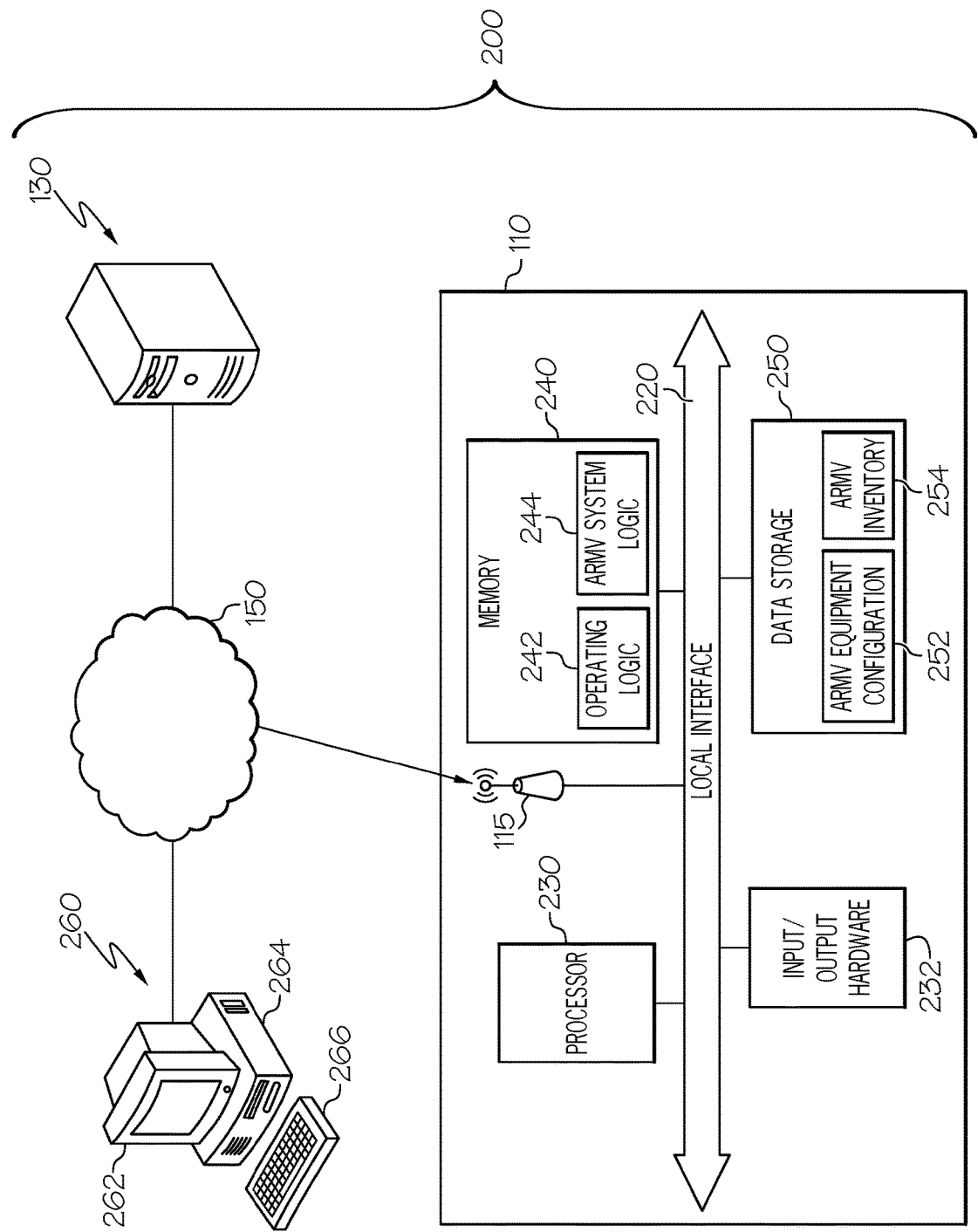
FIG. 2 schematically depicts components of a roving maintenance vehicle system according to one or more embodiments shown and described herein.

Referring now to FIG. 2, components of a roving maintenance vehicle system 200 are depicted. As mentioned above, the roving maintenance vehicle system 200 may be implemented through one or more computing devices 130 connected through a network 150 or within a roving maintenance vehicle 110 or through a combination of both. The roving maintenance vehicle system 200 depicted in FIG. 2 includes a computing device 130, a remote computing terminal 260 and a roving maintenance vehicle 110. The roving maintenance vehicle 110 includes a transceiver 115 (e.g. network interface hardware), a processor 230, a memory component 240, input/output hardware 232, and a data storage component 250. A local interface 220 may also be implemented as a bus or other interface to facilitate communication among the components of the roving maintenance vehicle 110. The roving maintenance vehicle 110 may be connected to a network 150, a remote computing terminal 260, and/or a computing device 130 such as a server.

The transceiver 115 is coupled to the local interface 220 and communicatively coupled to the computing device (e.g., the processor 230 and the memory component 240). The transceiver 115 may be any device capable of transmitting and/or receiving data via a network 150. Accordingly, transceiver 115 can include a communication transceiver 115 for sending and/or receiving any wired or wireless communication. For example, the transceiver 115 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the transceiver 115 includes hardware configured to operate in accordance with the Bluetooth wireless communication protocol. In another embodiment, the transceiver 115 may include a Bluetooth send/receive module for sending and receiving Bluetooth communications to/from a network 150.

In some embodiments, the roving maintenance vehicle 110 may be communicatively coupled to the network 150. The network 150 may be a personal area network that utilizes Bluetooth technology to communicatively couple the roving maintenance vehicle 110 with one or more vehicles and one or more remote computing devices such as a personal device of a user or any other network connectable device. In other embodiments, the network 150 may include one or more computer networks (e.g., a personal area network, a local area network, or a wide area network), cellular networks, satellite networks and/or a global positioning system and combinations thereof. Accordingly, the roving maintenance vehicle 110 can be communicatively coupled to the network 150 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, the processor 230 may include any processing component configured to receive and execute programming instructions (such as from the memory component 240 and/or the data storage component 250). The instructions may be in the form of a machine-readable instruction set stored in the memory component 240 and/or the data storage component 250 (e.g., one or more programming instructions). Accordingly, the processor 230 may be an electric controller, an integrated circuit, a microchip, a computer, or any other computing device. The processor 230 is communicatively coupled to the other components of the roving maintenance vehicle 110 through the local interface 220 and/or the transceiver 115. Accordingly, the local interface 220 may communicatively couple any number of processors 230 with one another, and allow the components coupled to the local interface 220 to operate in a distributed computing environment. Specifically, each of the components may operate as a node that may send and/or receive data. Furthermore, while the embodiment depicted in FIG. 2 includes a single processor 230, some embodiments may include more than one processor 230.

The input/output hardware 232 may include a monitor, keyboard, mouse, printer, camera, microphone, speaker, and/or other device for receiving, sending, and/or presenting data.

The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and autonomous roving maintenance system logic 244 (ARMV System Logic 244), each of which may be embodied as a computer program, firmware, or hardware, as an example, and will be described in more detail herein.

The operating logic 242 may include an operating system and/or other software for managing components of the roving maintenance vehicle 110. The ARMV System Logic 244 may include logic specific to carrying out functions of the roving maintenance vehicle system 200, for example, which will be described in more specific detail with respect to FIG. 5.

The data storage component 250 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 250 may reside local to and/or remote from the roving maintenance vehicle 110 and may be configured to store one or more pieces of data for access by the roving maintenance vehicle 110 and/or other components.

As illustrated in FIG. 2, the data storage component 250 stores, for example, ARMV equipment configuration 252 and ARMV inventory 254. The ARMV equipment configuration 252 may define the equipment capabilities and robotic maintenance and repair functionalities of the roving maintenance vehicle 110. The ARMV inventory 254 may include a database of the parts, equipment, and other materials such as fuel and oil that the roving maintenance vehicle 110 currently has available to provide to vehicles for which it is or may service. These sets of data may be utilized by the system when determining which vehicle service may be provided to.

Still referring to FIG. 2, it should be understood that the roving maintenance vehicle 110 may be communicatively coupled to a network 150, a remote computing terminal 260, and/or a computing device 130. The network 150 may include a wide area network, such as the internet, a local area network (LAN), a mobile communications network, a public service telephone network (PSTN) and/or other network. The remote computing terminal 260 may include a display 262, a processing unit 264 and an input device 266, each of which may be communicatively coupled together and/or to the network 150. The remote computing terminal 260 may be used to interface with a front-end application or provide administrative functionality, which may provide control and/or interaction with the roving maintenance vehicle 110. In some embodiments, one or more user remote computing terminals 260 may be implemented so that one or more users may interact with the roving maintenance vehicle 110.

Additionally, a computing device 130 such as a server may be communicatively coupled through the network 150 to the roving maintenance vehicle 110. The computing device 130 may implement one or more functionalities of the roving maintenance vehicle 110, provide processing resources, data storage, administrator supervision, or the like.

It should be understood that while the remote computing terminal 260 and the computing device 130 are depicted as a personal computer and a server, respectively, these are merely examples. More specifically, any type of computing device (e.g., mobile computing device, personal computer, server, and the like) may be utilized for any of these components. Additionally, while each of these computing devices and the roving maintenance vehicle 110 is illustrated in FIG. 2 as a single piece of hardware, this is also an example. More specifically, each of the remote computing terminal 260, the computing device 130, and the roving maintenance vehicle 110 may represent a plurality of computers, servers, databases, and the like operating in a distributed computing configuration to form the roving maintenance vehicle system 200.

Figure 3:
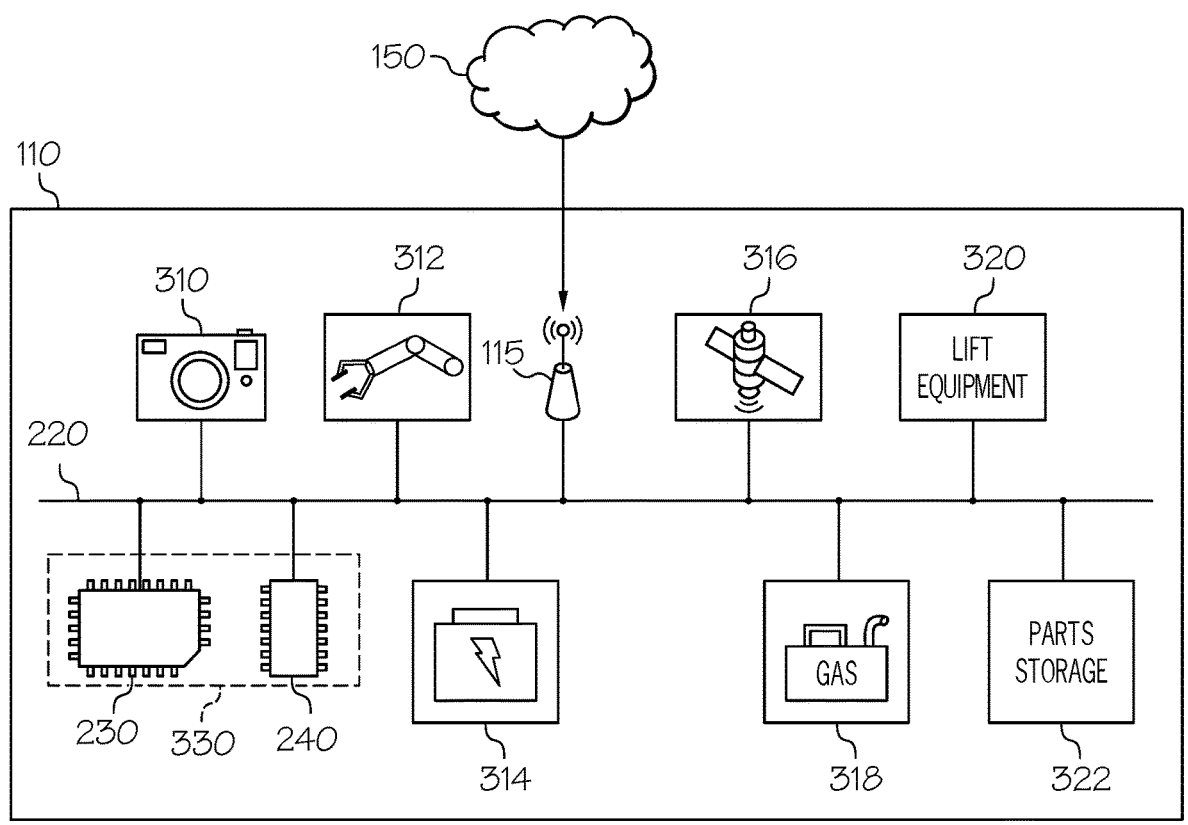
FIG. 3 schematically depicts components of a roving maintenance vehicle according to one or more embodiments shown and described herein.

Turning now to FIG. 3, an illustrative example of additional components of the roving maintenance vehicle 110 is depicted. A roving maintenance vehicle 110 may take one or many forms. For example, a roving maintenance vehicle 110 may be a flatbed type tow truck outfitted with one or more features and functionalities for preforming remote and/or autonomous service on a vehicle. In some embodiments, the roving maintenance vehicle 110 may be a tractor trailer type vehicle having a lift bay configured for maneuvering a vehicle for servicing. Independent of the type of vehicle that may be configured as a roving maintenance vehicle 110, a roving maintenance vehicle 110 may include a transceiver 115, a camera 310, a robotic arm 312, a battery charger 314, a navigation system 316, a fuel dispensing system 318, lift equipment 320, parts storage 322, and a controller 330 having a processor 230 and a memory component 240.

These components and others may be communicatively coupled via the local interface 220.

As described above the transceiver 115 may be any device capable of transmitting and/or receiving data via a network 150 or with one or more other transceivers 115 directly. The camera 310 may be any device having an array of sensing devices (e.g., a CCD array or active pixel sensors) capable of detecting radiation in an ultraviolet wavelength band, a visible light wavelength band, or an infrared wavelength band. The camera 310 may have any resolution. The camera 310 may be an omni-direction camera or a panoramic camera. In some embodiments, one or more optical components, such as a mirror, fish-eye lens, or any other type of lens may be optically coupled to the camera 310. In operation, image data captured by the camera 310 may provide the roving maintenance vehicle 110 with functionality such as object identification, location information, and maneuvering capabilities. The image data along with sensor data from one or more other sensors may enable the roving maintenance vehicle 110 to operate autonomously such that the vehicle may move from one location to another. Image data from a camera 310 may also enable autonomous repair services. For example, the camera may act as eyes for a robotic arm 312 that may perform vehicle services such as replace components, connect a battery charger 314 to a charging port of a vehicle, dispense fuel into a fuel tank, or the like.

A roving maintenance vehicle 110 may be configured to perform services on the vehicle. To do so a roving maintenance vehicle 110 may be equipped with a robotic arm 312. The robotic arm 312 may be any robotic manipulator having an end effector that may be used to carry out predetermined tasks. In some embodiments, for example, a vehicle being serviced may be maneuvered onto a flatbed tow truck type roving maintenance vehicle 110 so that a robotic arm 312 that is configured on the roving maintenance vehicle 110 may access components of the vehicle from a predefined position. The robotic arm 312 may connect a battery charger 314 to terminals of a battery of the vehicle being serviced or a charging port on the vehicle. In some instances, the robotic arm 312 may be configured to remove a wheel to replace a tire, unscrew and replace an oil filter, extract and replace an air filter, replace windshield wipers or the like. It should be understood that these are only a few example tasks a robotic arm 312 may be programed and configured to complete with respect to service on a vehicle.

The roving maintenance vehicle 110 may also include a battery charger 314, which may be any device capable of providing electricity to the vehicle being serviced, in particular to charge the battery. For example, in some cases the roving maintenance vehicle system 200 may determine that a vehicle (e.g., an electric powered vehicle) parked in a parking lot requires a charge. A roving maintenance vehicle 110 equipped with a battery charger 314 may be dispatched to charge the battery of the vehicle, for example, while the owner is not present at the vehicle. That is, the roving maintenance vehicle system 200 may provide services such as battery charging to a vehicle while the vehicle sits idle.

In some embodiments, the roving maintenance vehicle 110 may include a fuel dispensing system 318 for refueling a vehicle. Similar to charging a battery of an electric vehicle the roving maintenance vehicle system 200 may be configured to identify a vehicle in need of fuel in response to broadcasting the availability of a roving maintenance vehicle 110 and dispatching a roving maintenance vehicle 110 capable of automatically refueling the vehicle while the vehicle sits idle.

Still referring to FIG. 3, when a roving maintenance vehicle system 200 identifies a vehicle in need of service and dispatches a roving maintenance vehicle 110, the roving maintenance vehicle 110 may autonomously navigate to the location of the vehicle. To do so, the roving maintenance vehicle 110 may utilize a navigation system 316 such as a global position system (GPS). The navigation system 316 is coupled to the local interface 220 and communicatively coupled to the controller 330. The navigation system 316 is capable of generating location information indicative of a location of the vehicle by receiving one or more GPS signals from one or more GPS satellites. The GPS signal communicated to the controller 330 via the local interface 220 may include location information comprising a National Marine Electronics Association (NMEA) message, a latitude and longitude data set, a street address, a name of a known location based on a location database, or the like. Additionally, the GPS may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Still referring to FIG. 3, a roving maintenance vehicle 110 may include hardware and tools such as lift equipment 320 for lifting, reposition, and/or transporting a vehicle that requires service. As briefly described above, a roving maintenance vehicle 110 may be a flatbed type tow truck. In operation, the roving maintenance vehicle 110 may automatically maneuver a vehicle using the flat bed portion, a winch, and other lift equipment 320 configured therein to position a vehicle for service. Additionally, a roving maintenance vehicle 110 may include a parts storage 322. The parts storage 322 may be configured to automatically track inventory of components within the parts storage 322 so that the roving maintenance vehicle system 200 may determine the resources and capabilities available for a particular roving maintenance vehicle 110.

The roving maintenance vehicle 110 may further include one or more controllers 330. The controller 330 may be any device or combination of components comprising a processor 230 and memory component 240, as described above with respect to FIG. 2. The controller 330 may control the operations of the roving maintenance vehicle 110 and/or implement functions of the roving maintenance vehicle system 200.

It should be understood that the roving maintenance vehicle 110 described with reference to FIG. 3 is only an example and other configurations may be implemented without deviating from the scope of the present disclosure. Furthermore, it should be understood that the roving maintenance vehicle system 200 described herein may be implemented within the components and systems of the roving maintenance vehicle 110.

Figure 4:
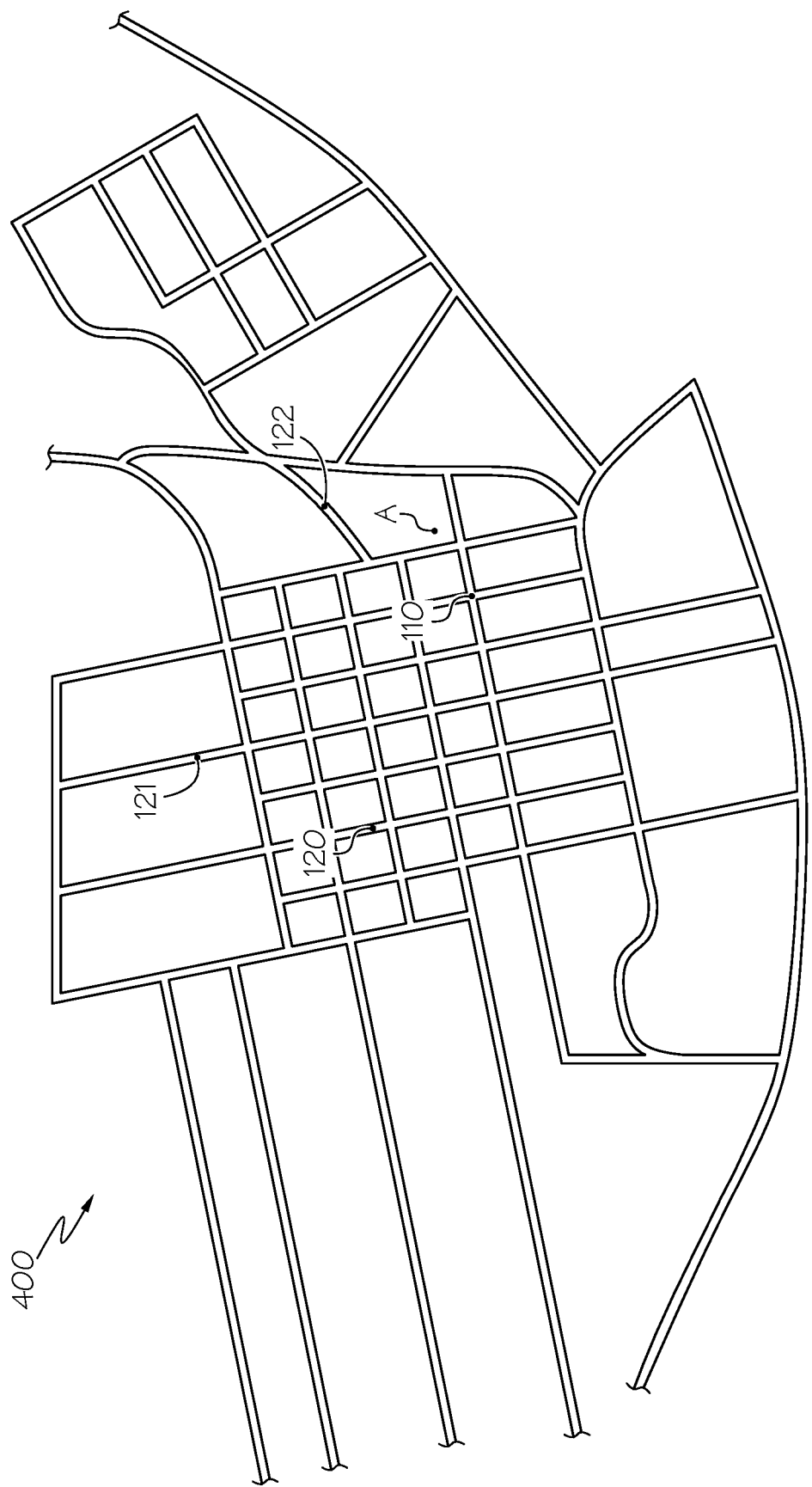
FIG. 4 depicts an illustrative example of a roving maintenance vehicle system implemented in a dynamic environment according to one or more embodiments shown and described herein.

Referring now to FIG. 4, an illustrative example of a roving maintenance vehicle system 200 implemented in a dynamic environment is depicted. As discussed above the roving maintenance vehicle system 200 may be implemented in an area 400 (e.g., a city) where vehicles for service are parked in a parking lot. However, in some embodiments the roving maintenance vehicle system 200 may be implemented to broadcast to and identify vehicles traveling in an area 400 and further coordinate a location to meet up with a roving maintenance vehicle 110 for service. For example, FIG. 4 depicts an area 400 including three vehicles 120, 121, 122 traveling on various roads. A roving maintenance vehicle 110 is also traveling within the area 400 and is available to provide service. A broadcast notification may be sent to the vehicles 120, 121, 122 in the area 400. For example, should vehicle 122 be identified as requiring service the roving maintenance vehicle system 200 may coordinate a location (e.g., location A) where the vehicle 122 and the roving maintenance vehicle 110 may meet to complete the required service. Location A may be a parking lot, a shoulder of a road or other location where the vehicle 122 may be parked for service. In some embodiments, the coordinated location may be the destination of a passenger or driver of the vehicle 122 such that the vehicle is planned to be idle for a period of time.

Figure 5:
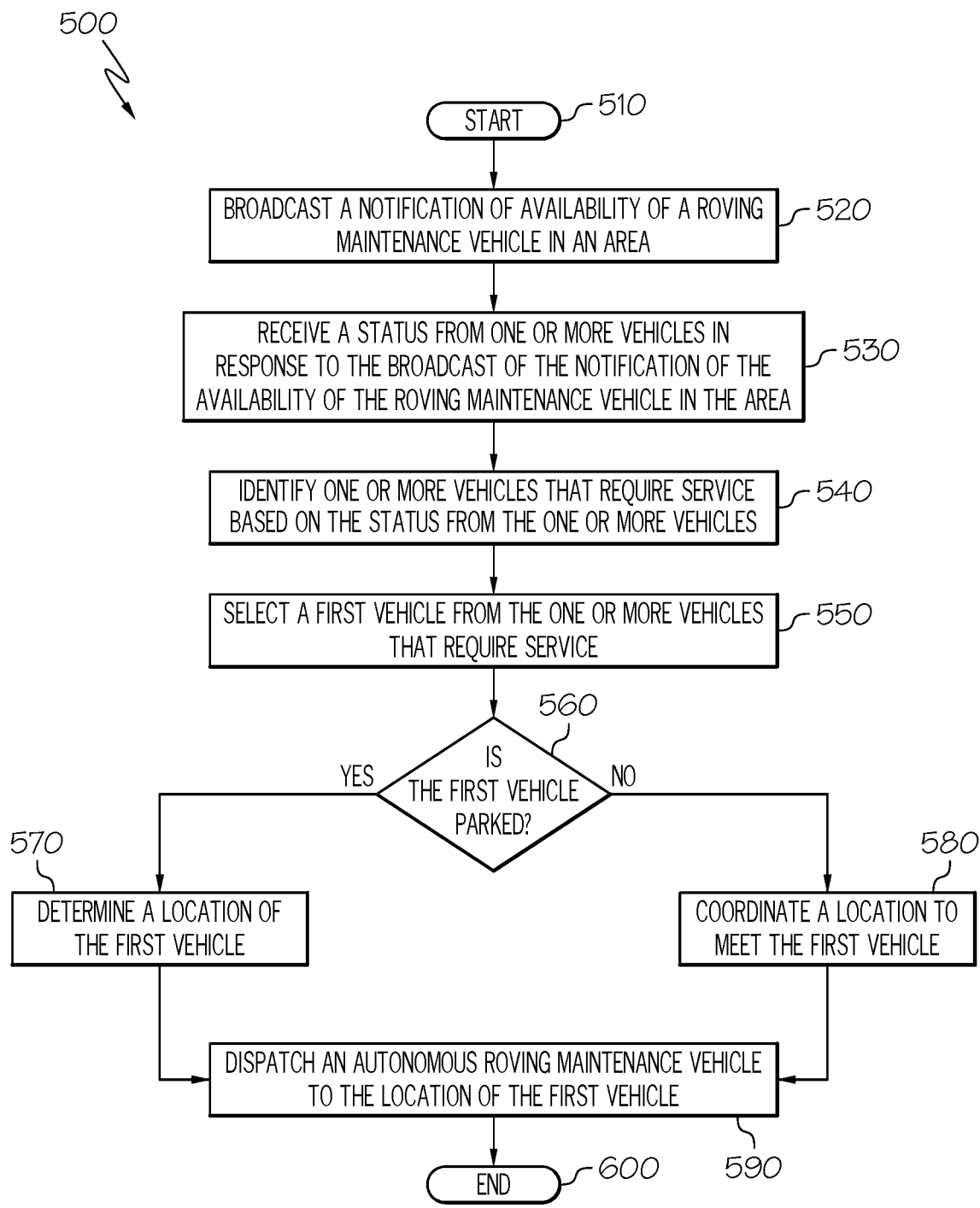
FIG. 5 depicts a flowchart of an example method for providing a roving maintenance vehicle according to one or more embodiments shown and described herein.

Referring now to FIG. 5, a flowchart 500 of an example method for providing the roving maintenance vehicle 110 is depicted. The flowchart 500 may be implemented as a machine-readable instruction set for causing a roving maintenance vehicle system 200 to perform one or more operations. At block 510, a roving maintenance vehicle system 200 may be initialized. This may occur when a roving maintenance vehicle 110 is powered on, a computing device is connected to the roving maintenance vehicle system 200 or some other initializing event occurs. At block 520, the roving maintenance vehicle system 200 may broadcast a notification of availability of a roving maintenance vehicle 110 within an area. The notification may include an inquiry for the status of one or more vehicles within the area. The inquiry may include a request for the status of the oil level or oil replacement history, a fuel level, a battery state of charge, a diagnostic trouble code (DTC), or the like. In response to the notification being received by a vehicle, a vehicle may send a response. The response may be to a specific inquiry provided within the notification or may consist of status information not specifically requested in the notification. In some embodiments, the notification may not request specific status information; rather the receipt of the notification by a vehicle may automatically trigger a response.

At block 530, the roving maintenance vehicle system 200 may receive a status from one or more vehicles in response to the broadcast of the notification of the availability of the roving maintenance vehicle 110 in the area. In some instances, a vehicle may not send a response to the notification if the vehicle, for example, is not subscribed or the owner does not wish to receive remote service from the roving maintenance vehicle system 200. Once the status information is received, the roving maintenance vehicle system 200, at block 540, may identify one or more vehicles that require service based on the status from the one or more vehicles. For example, a vehicle may indicate that the state of charge of its battery is low and requires a boost or a charge. By way of another example, a vehicle may indicate that the oil filter is old and needs to be replaced. At block 550, the roving maintenance vehicle system 200 may select a first vehicle from the one or more vehicles that require service, for example, based on the capability of the roving maintenance vehicle 110. The capability of the roving maintenance vehicle 110 may be defined by an equipment configuration of the autonomous roving maintenance vehicle and/or an inventory of parts in the autonomous roving maintenance vehicle. For example, an available roving maintenance vehicle 110 may not be equipped to change an oil filter but may be able to provide a charge to a low battery; therefore, the system may select the vehicle, which requires a charge over one that requires an oil change.

At block 560, the roving maintenance vehicle system 200 may determine whether the vehicle is parked. If the vehicle is parked, then at block 570, the location of the first vehicle is determined. However, if the vehicle is not parked, then at block 580 further communications with the vehicle may be completed to coordinate a location for the autonomous roving maintenance vehicle 110 to meet the first vehicle. For example, the roving maintenance vehicle system 200 may send a location in a notification to the driver of the vehicle to drive to a parking lot and park. In other instances, the driver or vehicle may provide the roving maintenance vehicle system 200 with the destination of the vehicle and the roving maintenance vehicle system 200 may utilize that location as a location to meet up with the first vehicle.

At block 590, the roving maintenance vehicle system 200 may dispatch an autonomous roving maintenance vehicle 110 to the location of the first vehicle. The autonomous roving maintenance vehicle 110 may autonomously navigate to the location of the first vehicle. Upon arrival, the autonomous roving maintenance vehicle 110 may autonomously or with the assistance of a traveling mechanic provide service to the vehicle. At block 600, the method may end until the autonomous roving maintenance vehicle 110 is available again. In other embodiments, the roving maintenance vehicle system 200 may restart to identify additional vehicles requiring service and dispatch other available autonomous roving maintenance vehicles 110 to render service.

It should now be understood that embodiments described herein are directed to systems and methods of providing a roving maintenance vehicle by broadcasting an availability to vehicles in an area, receiving status information from a vehicle, identifying a vehicle in need of services, and dispatching a roving maintenance vehicle to the location of the vehicle. Furthermore, it should be understood that the present concept may include a roving maintenance vehicle (e.g., an autonomous vehicle) capable of providing maintenance on vehicles (e.g., changing oil, inflating tires, changing tires, swapping out batteries, providing fuel or charge to a battery, or the like) in a geographic area autonomously or with assistance from a mechanic traveling in the autonomous roving maintenance vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A roving maintenance vehicle system comprising:
   a computing device having a processor; and
   a transceiver unit communicatively coupled to the computing device, wherein the computing device is configured to:
   broadcast within an area, via the transceiver unit, a notification of availability of a roving maintenance vehicle in the area, the broadcasted notification being received directly by vehicles in the area;
   receive, via the transceiver unit, a status from one or more vehicles in response to the one or more vehicles receiving the broadcast of the notification of availability of the roving maintenance vehicle in the area, wherein the one or more vehicles are within the area of broadcast;
   identify a first vehicle that requires service among the one or more vehicles based on the status from the one or more vehicles; and
   dispatch the roving maintenance vehicle to a location of the first vehicle that requires service.

2. The roving maintenance vehicle system of claim 1, wherein the computing device is further configured to:
   select the first vehicle as a vehicle to be serviced by the roving maintenance vehicle based on a capability of the roving maintenance vehicle to provide assistance to the first vehicle.

3. The roving maintenance vehicle system of claim 2, wherein the capability of the roving maintenance vehicle is defined by at least one of:
   an equipment configuration of the roving maintenance vehicle; or
   an inventory of parts in the roving maintenance vehicle.

4. The roving maintenance vehicle system of claim 1, wherein the notification of availability includes one or more inquiries for a status of one or more vehicle systems or components.

5. The roving maintenance vehicle system of claim 4, wherein the one or more inquiries for the status includes at least one of:
   an oil status;
   a fuel level;
   a battery state of charge; or
   a diagnostic trouble code.

6. The roving maintenance vehicle system of claim 1, wherein the roving maintenance vehicle autonomously navigates to the location of the first vehicle.

7. The roving maintenance vehicle system of claim 1, wherein the area is a parking lot.

8. A method of providing a roving maintenance vehicle, the method comprising:
   broadcasting within an area, via a transceiver unit, a notification of availability of the roving maintenance vehicle in the area, the broadcasted notification being received directly by vehicles in the area;
   receiving, via the transceiver unit, a status from one or more vehicles in response to the one or more vehicles receiving the broadcast of the notification of availability of the roving maintenance vehicle in the area, wherein the one or more vehicles are within the area of broadcast;
   identifying a first vehicle that requires service among the one or more vehicles based on the status from the one or more vehicles; and
   dispatching the roving maintenance vehicle to a location of the first vehicle that requires service.

9. The method of claim 8, further comprising:
   selecting the first vehicle as a vehicle to be serviced by the roving maintenance vehicle based on a capability of the roving maintenance vehicle to provide assistance to the first vehicle.

10. The method of claim 9, wherein the capability of the roving maintenance vehicle is defined by at least one of:
    an equipment configuration of the roving maintenance vehicle; or
    an inventory of parts in the roving maintenance vehicle.

11. The method of claim 8, wherein the notification of availability includes one or more inquiries for a status of one or more vehicle systems or components.

12. The method of claim 11, wherein the one or more inquiries for the status includes at least one of:
    an oil status;
    a fuel level;
    a battery state of charge; or
    a diagnostic trouble code.

13. The method of claim 8, wherein the roving maintenance vehicle autonomously navigates to the location of the first vehicle.

14. The method of claim 8, wherein the area is a parking lot.

15. A roving maintenance vehicle comprising:
    a computing device having a processor;
    a navigation system for navigating the roving maintenance vehicle to a first vehicle that requires service, wherein the navigation system is communicatively coupled to the computing device; and
    a transceiver unit communicatively coupled to the computing device, wherein the computing device is configured to:
    broadcast within an area, via the transceiver unit, a notification of availability of the roving maintenance vehicle in the area, the broadcasted notification being received directly by vehicles in the area;
    receive, via the transceiver unit, a status from one or more vehicles in response to the one or more vehicles receiving the broadcast of the notification of availability of the roving maintenance vehicle in the area, wherein the one or more vehicles are within the area of broadcast;
    identify the first vehicle that requires service among the one or more vehicles based on the status from the one or more vehicles; and
    autonomously maneuver the roving maintenance vehicle to a location of the first vehicle that requires service.

16. The roving maintenance vehicle of claim 15, wherein the computing device is further configured to:
    select the first vehicle as a vehicle to be serviced by the roving maintenance vehicle based on a capability of the roving maintenance vehicle to provide assistance to the first vehicle.

17. The roving maintenance vehicle of claim 16, wherein the capability of the roving maintenance vehicle is determined by at least one of:
    an equipment configuration of the roving maintenance vehicle; or
    an inventory of parts in the roving maintenance vehicle.

18. The roving maintenance vehicle of claim 15, wherein the notification of availability includes one or more inquiries for a status of one or more vehicle systems or components.

19. The roving maintenance vehicle of claim 18, wherein the one or more inquiries for the status includes at least one of:
  an oil status;
  a fuel level;
  a battery state of charge; or
  a diagnostic trouble code.

20. The roving maintenance vehicle of claim 15, wherein the area is a parking lot.

\* \* \* \* \*

UNITED STATES PATENT AND TRADEMARK OFFICE
CERTIFICATE OF CORRECTION

PATENT NO. : 11,393,260 B2
APPLICATION NO. : 16/240264
DATED : July 19, 2022
INVENTOR(S) : Raja Shekar and Joshua Batie It is certified that error appears in the above-identified patent and that said Letters Patent is hereby corrected as shown below:

On the Title Page

In page 2, Column 1, item (56), U.S. Patent Documents, cite no. 8, delete "Stams" and insert --Starns--, therefor.

Signed and Sealed this
Thirtieth Day of August, 2022

Katherine Kelly Vidal
*Director of the United States Patent and Trademark Office*